United States Patent

[11] 3,539,160

| [72] | Inventor | Raymond A. Henes<br>5816 E. Mockingbird Lane, Paradise Valley, Arizona 85251 |
|---|---|---|
| [21] | Appl. No. | 753,026 |
| [22] | Filed | July 16, 1968 |
| [45] | Patented | Nov. 10, 1970 |

[54] METAL FUSION CONTROL MEANS
16 Claims, 8 Drawing Figs.

[52] U.S. Cl. .................................................. 263/2, 263/4
[51] Int. Cl. ................................................. F24j 3/00
[50] Field of Search .................................. 263/2, 4, 5; 431/86, 18

[56] References Cited
UNITED STATES PATENTS

| 1,487,043 | 3/1924 | Youtsey et al. | 263/2 |
| 1,763,867 | 6/1930 | Rowland | 263/2X |
| 2,410,616 | 11/1946 | Webb | 263/2X |
| 2,632,841 | 3/1953 | Wharff | 263/4 |

Primary Examiner—John J. Camby
Attorney—William H. Dean

ABSTRACT: A metal fusion control means comprising a metal heater adapted to fuse metal such as solder. The heater being movable into contact or working position relative to metals to be fused by manual means which initiates operation of a timer to which it has connected means for retracting the said heater in a predetermined length of time compatible with a desired amount of fusion heat adapted to the work involved.

Patented Nov. 10, 1970

3,539,160

INVENTOR.
RAYMOND A. HENES
BY
Wm. H. Dean

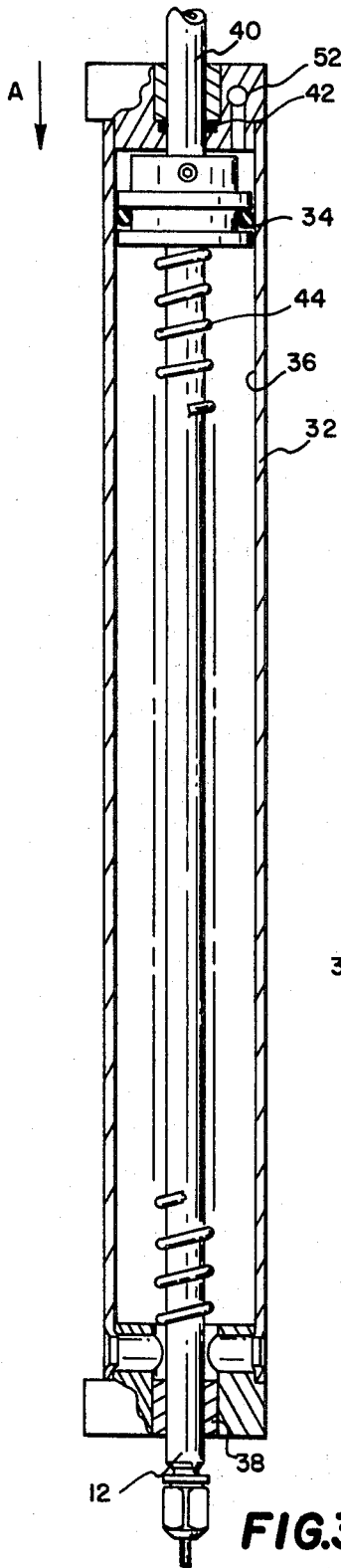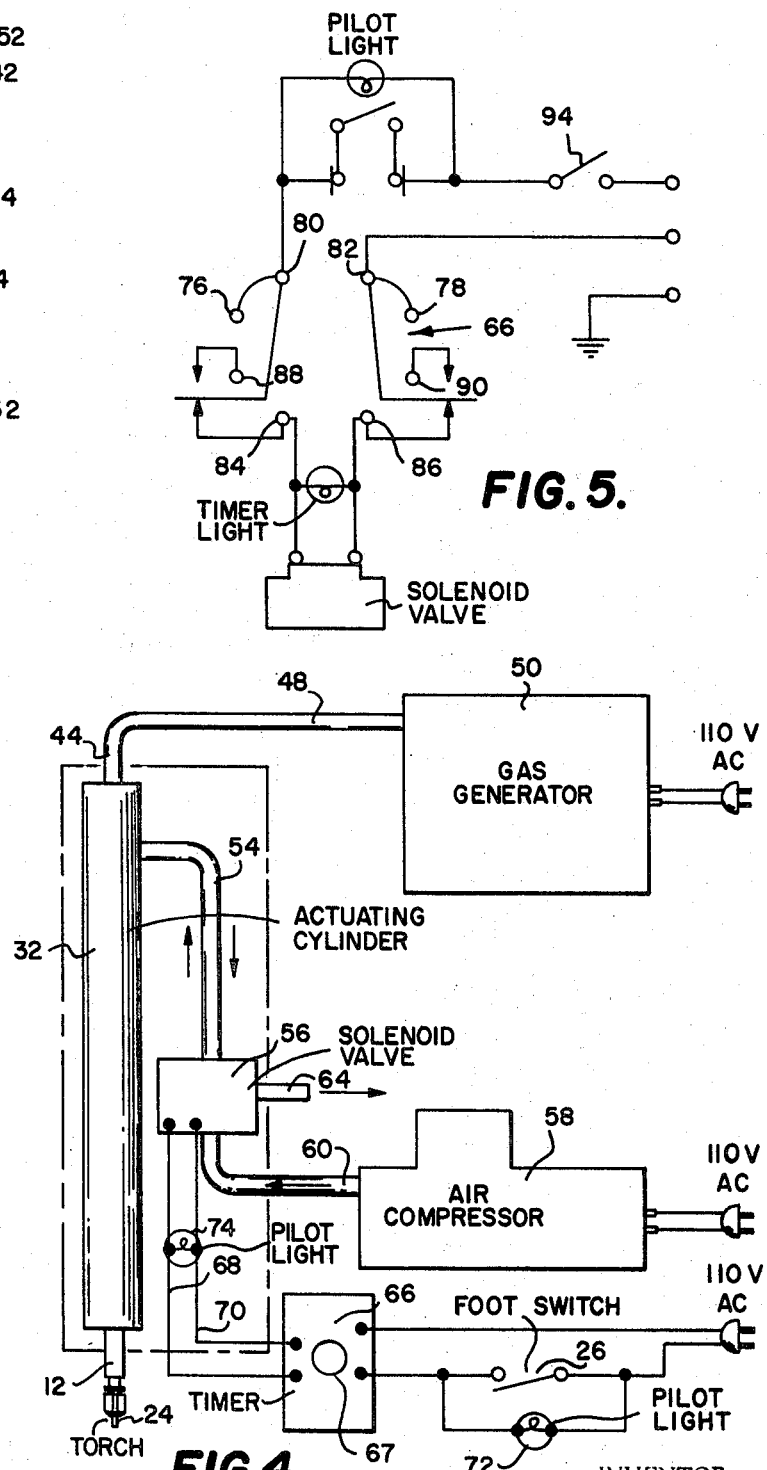

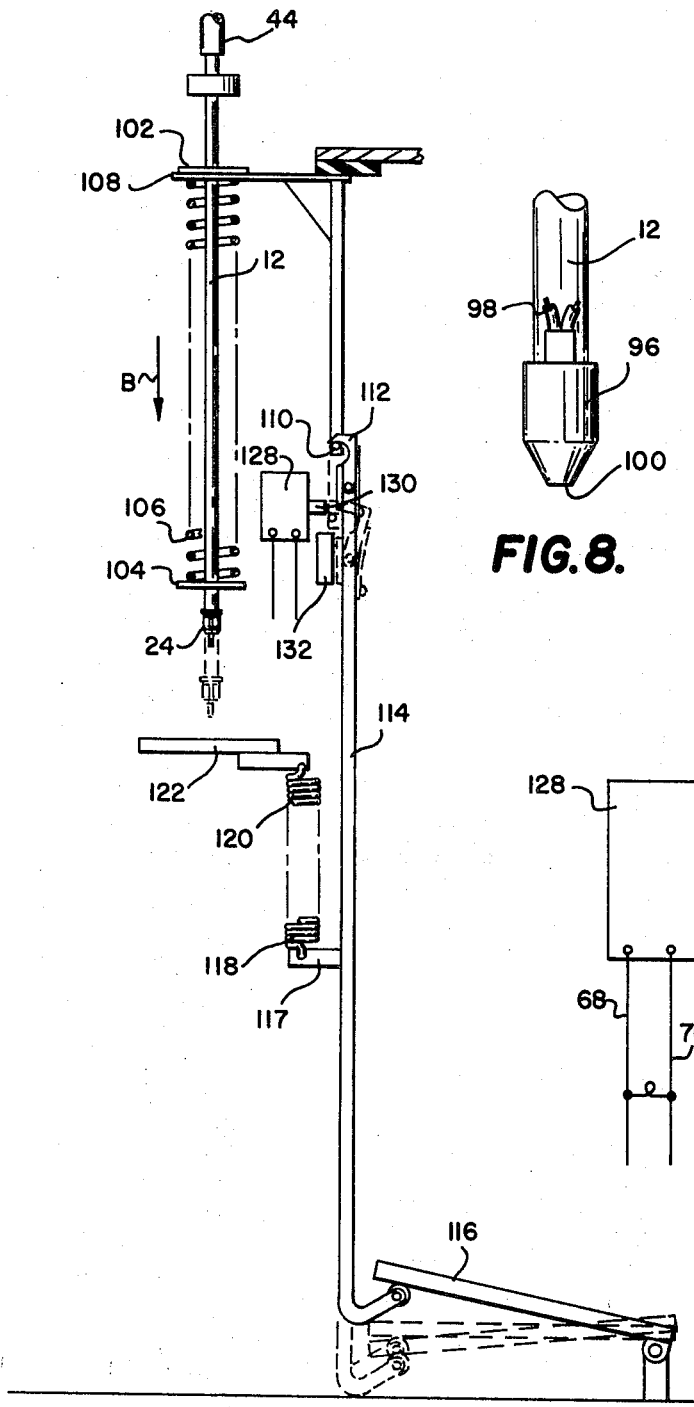

METAL FUSION CONTROL MEANS

This invention relates to a metal fusion control means and more particularly to a torch control means adapted to automatically and precisely retract a high temperature torch from work after a predetermined length of time in order to obtain proper fusion of parts without overheating elements in the surrounding area of the fusion work being accomplished.

BACKGROUND OF THE INVENTION

In the fusion of solder and various other metals and particularly such fusion operations in relation to delicate and small parts has always posed a problem of precise control of the heat applied to the parts so as to attain proper fusion of parts together, yet to prevent overheating of the surrounding area. This problem has been particularly apparent in relation to small delicate parts such as electronics parts normally fused to printed circuitry on circuit boards.

The circuit boards are generally of dielectric material which may be damaged by overheating, and many of the electronics parts are also very delicate and cannot be unduly heated. Accordingly, many of the assemblies being manufactured are put together laboriously by delicate and careful manual operation of soldering coppers which are conductively applied to the work and which tend, due to their slow rates of heat exchange, to heat unduly and, in many instances, to spread solder or other material to an undesirable degree. This method, however, has been chosen in many instances in preference to a high temperature torch which is very critical to control manually. Oxygen and hydrogen generators have been used to emit a very small diameter high temperature flame particularly adapted for use in fusing together and soldering various small delicate parts. However, due to the extremely high temperature of such flames and due to the minute proportions of the parts involved, it has been extremely difficult to manually control the use of such a torch in relation to the fusion of such small delicate parts, particularly those mounted on dielectric circuit boards which may readily be damaged by high temperature flames.

The use of such a torch must be very rapid and its direction must be very precise, and, accordingly, it has not been possible to obtain skilled operators capable of consistent and proper use of such high temperature flame emitting torches in relation to the production of electronic circuitry and other delicate articles when employing such torches.

The oxygen and hydrogen torches are very desirable in relation to the fusion of small delicate parts since very high temperatures can be attained in a very short length of time in very small concentrated areas which, if properly utilized, may fuse small delicate conductor portions together by means of solder or other materials without spreading heat over a substantial area.

SUMMARY OF THE INVENTION

The present invention relates to a metal fusing control means, and more particularly, to the precise control of a high temperature torch or heater for use in precision fusing operations relative to the production of such items as circuit boards having printed circuitry thereon, small delicate parts and dielectric boards which may be damaged by undue heating. The invention comprises a novel control means which requires a manual operation at initiation of a cycle to bring the torch or heater into a working position relative to a circuit board or other items on which metals are being fused, whereupon after a predetermined length of time, the control means of the invention automatically and precisely retracts the torch or heater away from the work before the work is unduly heated, but allowing a sufficient length of time for proper fusion operations. The invention comprises a novel timer and torch retracting means which may be utilized with either a torch or a conductive heater tip.

The control means of the invention includes a manually operable switch which causes a torch or heater to be moved into working position relative to work being fused, the manual switch initiates operation of a timer, and the timer precisely times the application of the torch or heater to the work and causes rapid retraction thereof precisely to attain optimum fusion and minimum heat spreading to the area surrounding the fusion of the work.

Accordingly, it is an object of the present invention to provide a metal fusion control means which readily adapts a high temperature torch, such as an oxygen hydrogen torch, for use in production of printed circuitry, and particularly for fusing solder at the terminals of components on printed circuit boards.

Another object of the invention is to provide a metal fusion control means which may be successfully used in the production of printed circuit boards without skilled operators.

Another object of the invention is to provide a metal fusion means which is particularly adapted for use in connection with an oxygen and hydrogen torch.

Another object of the invention is to provide a metal fusion control means employing pneumatic means and spring means for actuating a torch such that the pneumatic means and spring means is controlled by a solenoid in connection with a timer, the operation of which may be initiated by any suitable manually operable switch.

Further objects and advantages of the invention may be apparent from the following specification, appended claims and accompanying drawings:

BRIEF DESCRIPTION OF THE DRAWINGS

FIG. 3 is an enlarged fragmentary sectional view taken substantially on the same plate as FIG. 1, and showing details of the torch or heater actuating cylinder and plunger of the invention;

FIG. 4 is a diagrammatic view of the invention showing the component parts of the controls of the invention;

FIG. 5 is a diagrammatic view of the timing means of the invention;

FIG. 6 is a diagrammatic view of a modification of the invention, shown in substantially the same position as the elements of the invention shown in FIG. 2;

FIG. 7 is an enlarged fragmentary view of a portion of the mechanism shown in FIG. 6; and FIG. 8 is a fragmentary view of a normally lower end of the plunger of the invention shown carrying a conductive heater tip which is adapted to be heated by an electrical resistance element.

DESCRIPTION OF THE PREFERRED EMBODIMENTS

Figure 1:
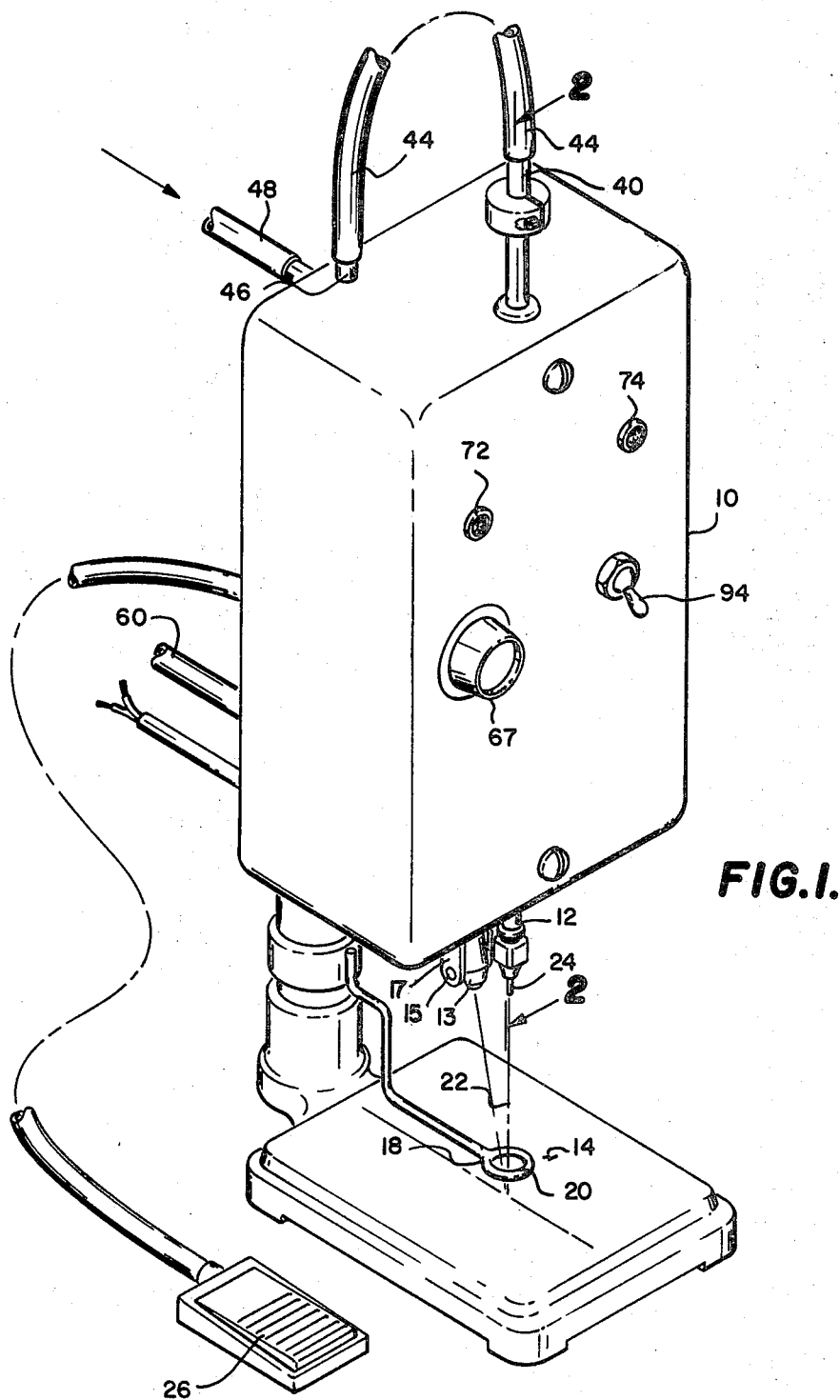
FIG. 1 is a fragmentary perspective view of a metal fusion control means in accordance with the present invention, and showing elements of the means omitted.

As shown in FIG. 1 of the drawings, the invention comprises a housing 10 which contains the control elements of the metal fusion control unit of the invention. Projecting downwardly from the housing 10 is a vertically movable torch carrying plunger 12 directed toward a work locator means 14 on which work, such as a circuit board 16, as shown in FIG. 2, may be located.

The work locator means of the invention also comprises a target means 18 and an aperture 20 adapted to be aligned with a flame axis 22 of a torch 24 carried by the plunger 12.

A lamp 13 is disposed to cast a pencil beam of light onto work to intersect said axis 22 on a level with work being processed. The lamp 13 is adjustably mounted on a pin 15 in a bracket 17 supported on the housing 10.

Figure 2:
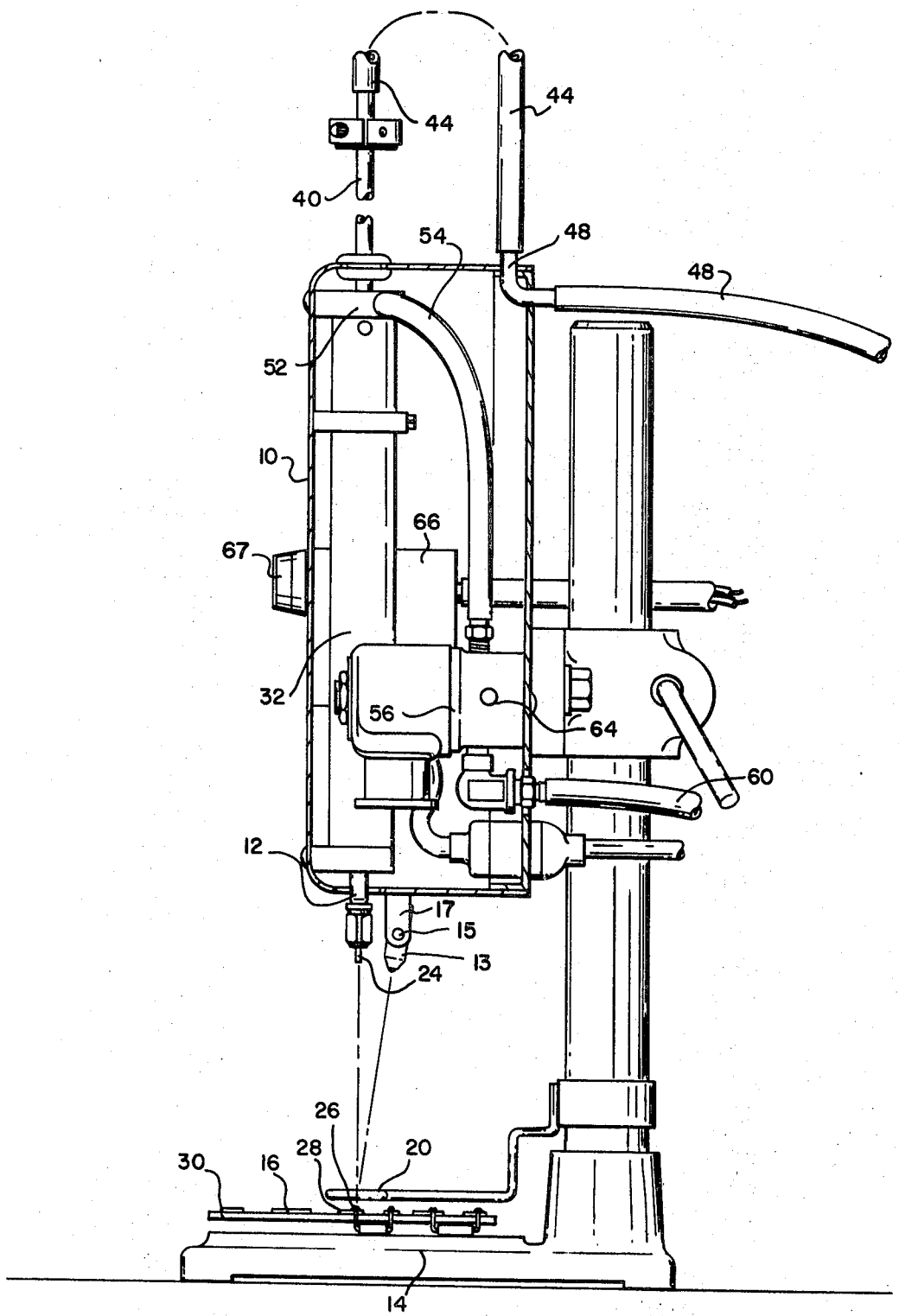
FIG. 2 is a vertical sectional view of a metal fusion control means taken from the line 2–2 of FIG. 1, showing parts and portions in elevation to facilitate the illustration and showing portions fragmentarily and illustrating an electronic circuit board disposed in relation to the work locator means of the invention.

The foot operated switch means 26 is adapted to be operated by an operator for initiating operation of the torch 24 with respect to the work 16 in alignment with the center of the aperture 20 or a spot of light cast by the lamp 13, all as shown best in FIGS. 1 and 2 of the drawings. On the circuit board 16 is a component portion 26 located in alignment with the center of the aperture 20 and light beam from the lamp 13, such that the torch 24 directs its flame onto the component portion 26 when moved downwardly, as will be hereinafter described, to fuse solder or other metal about the component 26. This component 26 may be a terminal of a transistor, capacitor, diode, or other electronic element, and fusion of solder may be accomplished around this terminal to fuse the terminal to printed circuitry 28 on a dielectric printed circuitry board 30. The torch carrying plunger 12 of the invention is reciprocally mounted in an air cylinder 32, shown in detail in FIG. 3 of the drawings. The plunger 12 is hollow and provided with a piston 34 sealingly slidable in a bore 36 of the cylinder 32. The plunger 12 at its lower portion slides through a packing gland 38 in the lower portion of the cylinder 32, while an upper end 40 of the hollow plunger slides through a packing gland 42 at the upper end of the cylinder 32.

A compression spring 44 surrounding the plunger 12 and disposed internally of the cylinder 36 tends compressively to retract the piston 34 and plunger 12 to the position shown in FIG. 3, while air pressure is adapted to be admitted into the cylinder 34 above the piston 32 for moving the plunger 12 in a direction of an arrow A in FIG. 3 of the drawings, downwardly so that the torch 24 may be forced into close proximity to the torch aperture 20 and the work 26, as shown in FIG. 2 of the drawings, all as will be hereinafter described in detail.

As shown in FIG. 1 of the drawings, a flexible conduit 44 is coupled by means of friction or any other suitable means to the upper end 40 of the hollow tubular portion 12 so as to conduct combustible gas into the hollow tubular conductor 12 and to the torch tip 12.

The flexible tube 44 is mounted on the housing 10 by means of a stationary hollow elbow 46 which also communicates with another flexible tube 48 extending to a gas generator 50. This gas generator 50 is adapted to electrolytically decompose water to its component parts of hydrogen and oxygen which are conducted in mixture through the tube 48, elbow 46, tube 44, plunger 12 and torch tip 24. The torch tip 24 may be a very small diameter tip adapted to emit a flame not over forty thousandths in diameter and due to the burning characteristics of hydrogen and oxygen in mixture, the flame may reach very high temperatures, as for example, approximately 6000°F. It will be understood that the application of such a high temperature flame to ordinary solder must be only momentary, and must be very critically controlled in order to prevent overheating of the electronic parts and the circuit board or any other elements which, in the industry, is used to fuse metals in connection therewith.

As shown in FIG. 3 of the drawings, the air cylinder 32 is provided with an air inlet and exhaust port 52 with which a hollow tubular conduit 54 is connected. This hollow tubular conduit 54 is coupled to a solenoid valve 56 adapted to control the inlet of compressed air into the cylinder 36 and the exhaust of air therefrom when the spring 44 retracts the piston 34 toward the port 52.

The solenoid valve is mounted in the housing 10, as shown in FIG. 2 of the drawings. As shown in FIG. 4 of the drawings, an air compressor 58 or any other suitable source of compressed air is provided with a delivery conduit 60 which communicates with the solenoid valve 56.

The solenoid valve, when energized, is adapted to conduct compressed air into the actuating cylinder 36, and when deenergized, is adapted to permit air to pass from the cylinder 36 through the port 52 and the tube 54 and outwardly through an exhaust tube 64 in connection with the solenoid valve 56.

As shown in FIG. 4 of the drawings, a timer 66 is coupled by means of conductors 68 and 70 to the solenoid valve 56 and in circuit with the timer 66 is the foot switch 26.

A pilot light 72 is coupled in parallel with the foot switch 26, and a timer light 74 is coupled between the conductors 68 and 70, all as will be hereinafter described in detail.

The operation, 66 is shown in detail in FIG. 5 2, the drawings. This timer 66 is generally a time delay relay and consists of a DPDT switch and a solid state timing module TDSS which is powered by conventional 110/120 v. AC at two of the eight socket pins of this conventional relay. These two last-mentioned socket pins being designated 76 and 78 in FIG. 5 of the drawings. Thus the timing module is coupled between the pins 76 or 68. The other six pins of the time delay relay are devoted to the six pawls of a double-pawl, double-throw switch. One pair of these pawls is for the two wires of 110/120 v. AC input, these two terminals being designated 80 and 82. A second pair of these terminals is for normally closed outlet of the 110/120 v. AC, and these terminals are designated 84 and 86. A third pair of these terminals is for normally open outlet of the 110/120 v. AC, and these terminals are designated 88 and 90.

The relay is coupled in circuit so that when current is fed to the solid state timing module TDSS by the foot switch 26, a current is simultaneously fed to the 110/120 v. AC input terminals 80 and 82 of the DPDT switch and through the closed poles 84 and 86 of the switch to the solenoid valve 56. Thus, the timer runs through a timer cycle interval and the solenoid remains in energized condition until the foot plate 26 is released or until the time delay internal runs out, whichever occurs first.

When the time interval runs out, the DPDT switch changes from its normal closed position to an open position, thereby releasing or deenergizing the solenoid 56, and when the foot switch is released, the timer 66 automatically resets and the DPDT switch changes to the normally closed connection ready for another cycle when the foot switch 26 is again actuated. The pilot light 72 is mounted on the cabinet 10 to indicate when the timer interval cycle is running, such that the pilot light goes on when the foot switch is actuated and goes off when the timing cycle has been completed, thereby indicating when the foot switch should be released in preparation for another cycle.

In operation, a circuit board 30, as shown in FIG. 2, when placed in the work locator means of the invention, is aligned by the aperture 20 with the flame axis of the torch 24 so that when the foot switch is closed and compressed, is admitted through the port 62 into the zone 32, the piston 34 will be actuated downwardly to return the plunger 12 to a stop position placing the cone of the torch flame at the torch tip 24 into optimum proximity with the work at 26, as shown in FIG. 2 of the drawings. While the foot switch 26 is actuated and the timer 66 starts its time delay interval, the flame is thus disposed at the work location 26, shown in FIG. 2. The time delay interval of the timer 66 may be adjusted by a manual knob 67 on the front of the housing 10 in order that the interval may correspond in length with the amount of time it takes the torch properly to fuse solder or other metal at the work area 26, shown in FIG. 2 of the drawings. Thus, as the timer interval expires, the spring 44 instantly retracts the plunger 12 due to the fact that as the timer interval expires, the solenoid valve 56 is deenergized and allows communication from tube 24 to the exhaust tube 64. Thus, the spring in moving the plunger 12 away from the work causes the piston 34 to force air from the zone 32 and to the exhaust tube 64 of the solenoid valve 56.

It will be appreciated by those skilled in the art that the time interval of fusion in connection with the work at 26 may be very critical due to a small delicate part, and particularly due to the very high temperature of the oxygen, hydrogen flame which is a great advantage to working with small parts. The precise timing and retraction of a torch tip 24 provides for very uniform soldering operations in connection with the component terminals on printed circuitry, such as the printed circuitry 28 and on dielectric boards 30, such as shown in FIG. 2. This contrasts greatly with the usual hand manual control torch which normally results in overheating of components and burning of the circuit board 30.

It will be seen that the circuit board may be placed between the support 14 and the aperture target 20 to align the work at 26 in the center of the aperture before the foot switch 26 is actuated.

A toggle switch 94 projects from the forward portion of the cabinet and this switch is shown correspondingly on the diagrammatic view, FIG. 5. This is a power on-off switch coupled to the timer circuit.

In the modification, as shown in FIG. 8, the plunger 12 carries a conductive heater tip 96 similar to an electrically heated soldering copper and electrical conductors 98 are coupled thereto and communicate with the heating element in the tip 96 so that this tip, as an engaging portion 100, may be brought to bear on the work at 26, shown in FIG. 2, in the event it is desired to use such a tip in lieu of a torch flame.

On the modification, as shown in FIGS. 6 and 7, the plunger 12 is reciprocally mounted in a pair of stationary guides 102 and 104 for vertical rectilinear movement. A tension spring 106 tends to retract the plunger upwardly in the direction of an arrow B in FIG. 6 of the drawings. A bracket 108 is fixed to the plunger 12 and carries a latch bar 110 engageable by a pivoted pawl 112 of an actuating link 114 which is manually movable downwardly by a foot pedal 116 while a spring 118 connected to the link 114 by a bracket 117 tends to move the link 114 and pawl 112 upwardly. An upper end 120 of the spring 118 is secured to a stationary bracket 122.

The pawl 112 is pivoted by means of a pin 124 to the link 114, and the plate spring 126 tends to hold the pawl 112 in the solid line position, as shown in FIG. 7 of the drawings.

A solenoid actuator 128 is provided with a movable armature 130 and the solenoid 128 is coupled to the hereinbefore described conductors 68 and 70 and is controlled by operation of the timer 66 in the same manner as the solenoid valve 56 is controlled, as hereinbefore described.

The foot pedal 116 is adapted to retract the link 114 and pawl 112 downwardly carrying the latch bar 110, bracket 108 and plunger 12, such that the torch 24 will be forced downwardly into working position with relation to the work locator means 114 and its component time element 18.

As the foot pedal 116 forces a bar 110 downwardly, it contacts a plunger 130 of a switch 123 which corresponds functionally with the foot switch 26 in the diagrammatic illustration of FIG. 4. This switch 132 then energizes the timer and the solenoid 128 forcing the plunger 130 thereof into the broken line position, shown in FIG. 7, thereby releasing the pawl 112 and passing over the bar 110 to lock the torch 24 and plunger 12 in downward position; the pawl 112 after being released from the bar 110 is moved further downwardly by the foot pedal 116 to a broken line position D in FIG. 7, where it is held until the timer interval runs out and the solenoid 128 retracts its plunger 130, thus releasing the bar 110 to move up in response to force of the spring 44 which also rapidly retracts the torch 24. The foot pedal may then be released upwardly in response to force of the spring 118, whereupon a ramp portion 134 of the pawl 112 snaps over the bar 110 ready for another cycle of operation.

It will be obvious to those skilled in the art that various modifications of the present invention may be resorted to in a manner limited only by a just interpretation of the following claims.

I Claim:

1. In a torch control means the combination of: a torch having a flame axis and adapted to emit a high temperature flame along said axis; a work locator adapted to locate work to be heated by said torch; first means adapted movably to support said torch for movement along said flame axis in directions toward and away from said work locator means and work located thereby; manually operable means adapted to move said torch toward said work locator means and into a working position relative thereto; a timer initially operable in connection with said manually operable means; and a third means operable by a said timer for automatically retracting said torch away from said work holder after said torch has been in said working position for a predetermined length of time in accordance with an operating cycle interval of said timer.

2. In a fusion heater control means, the combination of: a frame; a heater movably mounted on said frame; said heater having a tip and being adapted to emit heat at said tip; a work locator means adapted to locate work to be heated by said heater tip; first means adapted movably to support said heater for movement along a path in directions toward and away from said work locator means and work located thereby; manually operable means adapted to move said heater tip towards said work locator means and into a working position relative thereto; a timer initially operable in connection with said manually operable means; and third means operable by said timer for automatically retracting said heater tip away from said work locator means after said heater tip has been in said working position for a predetermined length of time in accordance with an operating cycle interval of said timer.

3. The invention, as defined in claim 1, wherein said work locator means comprises a target means, said target means being provided with an opening in alignment with said flame axis, whereby work to be heated may be located by said work locator means generally in alignment with the center of said opening in said opening in said target means.

4. In a torch control means, the combination of: a torch having a flame axis and adapted to emit a high temperature flame along said axis; a work locator means adapted to locate work to be heated by said torch; first means adapted movably to support said torch for movement along said flame axis in directions toward and away from said work locator means and work located thereby; second means adapted to move said torch toward said work locator means and into a working position relative thereto; a timer initially operable in connection with said second means; and third means operable by said timer for automatically retracting said torch away from said work holder means after said torch has been in said working position for a predetermined length of time in accordance with an operating cycle interval of said timer.

5. The invention as defined in claim 4 wherein an oxygen and hydrogen generator is disposed to deliver gas to said torch; and a flexible conduit interconnecting said generator and said torch.

6. The invention as defined in claim 4 wherein said second means comprises an air cylinder.

7. The invention, as defined in claim 4, wherein: said third means comprises an air cylinder plunger.

8. The invention, as defined in claim 4, wherein: said third means comprises a spring.

9. The invention, as defined in claim 4, wherein: said second means is an air cylinder having a plunger, said torch carried by said plunger; a source of compressed air; a solenoid valve disposed to control inlet and exhaust of compressed air relative to said cylinder; said timer coupled to said solenoid valve; said third means comprising a spring in said air cylinder adapted to retract said plunger and said torch when compressed air is exhausted from said cylinder by said solenoid valve; and a manually operable switch for initiating operation of said timer.

10. The invention, as defined in claim 9, wherein: said plunger is hollow and communicates with said torch for conducting gas thereto.

11. The invention, as defined in claim 2, wherein: said heater is an electrical resistance heater.

12. The invention, as defined in claim 1, wherein: said third means comprises a spring tending to retract said torch; and a solenoid holding said torch toward said work locator and releasably operable by said timer to permit said spring rapidly to retract said torch away from said work locator.

13. In a fusion heater control means the combination of: a heater having a tip, said tip adapted to emit heat; a work locator means adapted to locate work to be heated by said heater tip; first means adapted movably to support said heater for movement along a path in directions toward and away from said work locator means and work located thereby; manually operable means adapted to move said heater tip toward said work locator means and into a working position relative thereto; a timer initially operable in connection with said manually operable means; and spring means operable by said timer for automatically retracting said heater tip away from said work locator means after said heater tip has been in said working position for a predetermined length of time in accordance with an operating cycle interval of said timer.

14. The invention, as defined in claim 13, wherein: said heater is an oxygen hydrogen torch.

15. The invention, as defined in claim 13, wherein: a target means is provided with an opening and disposed in alignment with the path of said heater, whereby work may be located concentrically relative to said opening to thereby be engaged by said heater tip.

16. The invention, as defined in claim 2, wherein: said work locator means comprises a lamp disposed to cast a beam of light onto a work area to intersect a working position of said heater when it is moved toward said work.